Patented Nov. 29, 1932

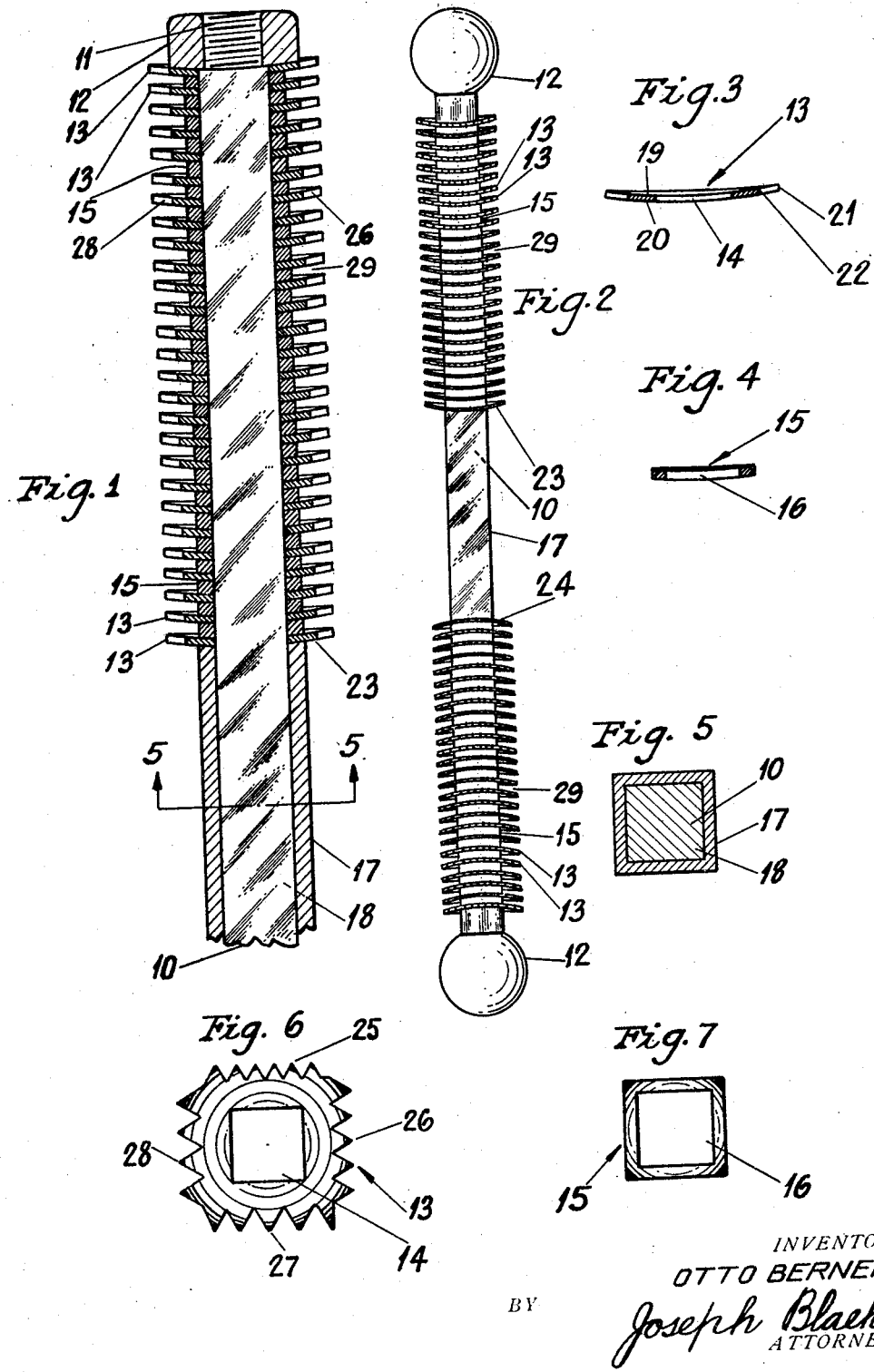

1,889,013

UNITED STATES PATENT OFFICE

OTTO BERNER, OF NEW YORK, N. Y.

COMPOSITE THREAD RESTORING TOOL

Application filed June 1, 1932. Serial No. 614,718.

The present invention relates to a composite thread restoring tool, and particularly to a construction having a plurality of apertured cutting blades removably held together and designed to recondition damaged threads upon bolts, shafts, screws and other externally threaded machine elements damaged from accidental impact of hammers, or which have become corroded or rusted.

An object of this invention is to provide said composite thread restoring tool with an elongated spindle, a plurality of sheet metal cutting blades each having an aperture and a plurality of cutting faces of different thread pitch, a plurality of sheet metal spacing members respectively positioned on said spindle intermediate said cutting blades, the cross-section of said spindle and the apertures in said cutting blades being preferably square or other non-circular form and serving to hold the cutting blades in cooperative longitudinal alignment on said spindle.

Another object of this invention is to provide a non-threaded sleeve mounted at the central portion of the spindle and to build up a set of screw thread restorers at each end of the spindle, both ends being threaded to receive nuts which serve as means for clamping the sets of assembled cutting blades in position on the spindle and allowing convenient removal and sharpening of the cutting faces when dulled by use.

Another object of this invention is to form the said sheet metal cutting blades with front and rear cutting faces parallel to each other and the cutting teeth of uniform thickness all over thus adapting said composite thread restoring tool for operating with reciprocatory forward and backward cutting motions.

Another object of this invention is to curve or bend each cutting blade into a single spherical form, the center of curvature being along the longitudinal axis of the spindle and to form the teeth of the threads on the cutting blades parallel with the longitudinal axis, so as to produce a smooth cutting tool and prevent the formation of chatter marks.

Another object of this invention is to form both ends of the spindle of larger diameter than the cutting blades so that when the composite thread restoring tool is accidentally dropped on a hard surface, the cutting faces will be protected against damage; the said enlarged end portions also serving as handles.

Another object of this invention is to make the spacing members of minimum thickness so as to produce a thread restoring tool having a maximum number of cutting blades per unit length and assure continuous engagement of the thread restoring tool with the thread being recut.

With the above and other objects in view the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is an enlarged fragmentary sectional view of the composite thread restoring tool.

Figure 2 is a plan view of an embodiment of this invention.

Figure 3 is an enlarged sectional view of one of the cutting blades.

Figure 4 is an enlarged sectional view of one of the spacing members.

Figure 5 is a cross-section of the composite thread restoring tool, the section being taken as on line 5—5 in Figure 1.

Figure 6 is an enlarged plan view of one of the cutting blades.

Figure 7 is an enlarged plan view of one of the spacing members.

In the illustrated embodiment of the invention, the several views show an elongated spindle 10, preferably of square cross-section and provided at each end with a screw thread 11, on which screws a nut 12, of hexagonal, spherical or of any other suitable form. Mounted at opposite ends on the spindle 10, is a plurality of hardened sheet metal cutting blades 13, 13, of substantially square form and each having an aperture 14, and spaced apart by sheet metal spacing members 15, 15, of square form and each having an aperture 16. Mounted at the central portion of the spindle 10, is a sleeve 17, of square cross-section and having an aperture 18.

As best shown in Figure 6, each cutting blade 13, is provided with four cutting faces, each face having a plurality of V-shaped cutting teeth of different thread pitch. As shown in Figure 2, it will be noted that when the nuts 12, 12, are drawn up tight against the cutting blades 13, 13, that there will be formed on opposite sides of the sleeve 17, independent sets of thread restoring means.

As best shown in Figure 3, the sheet metal cutting blades 13, are of uniform thickness all over and are spherically shaped and have spherical cutting faces 19, and 20, parallel to each other, and the faces 21, at the top and 22, at the root of the thread being parallel with the longitudinal axis and thus making it possible to cut forward as well as backward at the ends of the thread restoring tool, as well as at the central portion thereof.

Referring to Figure 2, it will be noted that the spherical nuts 12, 12, at the ends of the tool are of larger diameter than the cutting blades 13, 13, and serve to protect the cutting faces of the cutting blades from damage due to impact when the thread restoring tool is accidentally dropped upon a hard surface.

It will be noted that the apertures 14, in the cutting blades 13, and the apertures 16, in the spacing members 15, and the aperture 18, in the sleeve 17, are of square form and of the exact dimensions as the square spindle 10, and serve to hold the cutting blades and the teeth on the cutting faces in longitudinal alignment, so that when a plurality of cutting blades are placed in position on the spindle 10, and clamped thereon by the threaded nuts 12, 12, they will automatically be drawn up in longitudinal alignment with the cutting teeth in close cooperation.

As shown in Figure 6, the teeth 25, in the upper cutting face are generally V-shaped such as the U. S. Standard thread and are similar to the teeth 26, 27, and 28, in the other cutting faces and differ only in the degree of pitch. The spacing members 15, form narrow rectangular channels 29, between the cutting blades 13. These channels have curved parallel walls and are deeper than the root of the thread and serve as a clearance space to receive the separated metal chips falling from the cutting teeth and prevent the tool from clogging up.

It is thus readily seen that there has been provided a composite thread restoring tool having a plurality of cutting blades with generally V-shaped cutting teeth which are adapted to remove superfluous metal constituting a deformity on a damaged screw thread; a tool having replaceable sheet metal cutting blades of spherical form to produce a smooth cut without any chatter marks.

In accordance with the patent statutes I have described and illustrated the prefered embodiment of my invention, but it will be understood that various changes and modifications can be made therein without departing from the spirit of the invention as defined by the appended claims.

Having thus described my invention, what I claim as new and desire to secure by Letters Patent is:—

1. A composite thread restoring tool comprising an elongated spindle having a non-circular cross-section and threaded ends, a plurality of cutting blades having non-circular apertures and adapted to be mounted in longitudinal alignment and in spaced relation adjoining spacing members on said spindle, each of said cutting blades having a plurality of front and rear cutting faces with generally V-shaped cutting teeth adapted for longitudinal cutting each of said cutting blades being shaped to form a single spherical surface and the center of curvature being positioned along the longitudinal axis of the spindle and the V-shaped sides of said cutting teeth being parallel with the longitudinal axis of said spindle, and threaded members in engagement with said threaded ends for clamping said cutting blades on said spindle, the front and rear cutting faces of each blade being parallel and concentric, whereby said tool is adapted for smooth forward and backward cutting.

2. A composite thread restoring tool comprising a spindle having longitudinal aligning means, a plurality of cutting blades having teeth with angular sides and having apertures designed to engage with said aligning means, means for spacing said cutting blades on said spindle, means for clamping said cutting blades to said spindle, each of said cutting blades having a plurality of cutting faces with thread cutting teeth adapted for longitudinal cutting, said cutting blades being curved or bent equally in the same direction towards the longitudinal axis and the centers of curving or bending being positioned along the longitudinal axis of the spindle and the angular sides of said thread cutting teeth being parallel with the longitudinal axis of said spindle.

Signed at New York in the county of Bronx and State of New York this 31st day of May, A. D. 1932.

OTTO BERNER.